April 13, 1954   J. W. CLARK   2,675,222
ELECTRONIC MAGNETIC ANALYTICAL BALANCE
Filed Sept. 11, 1947
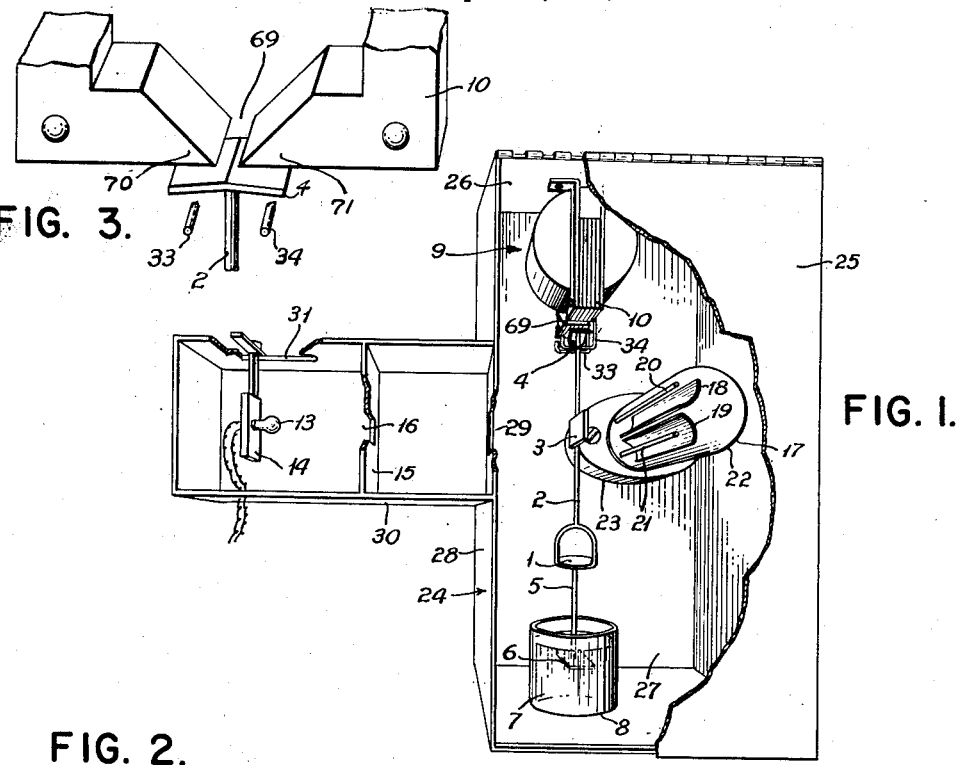
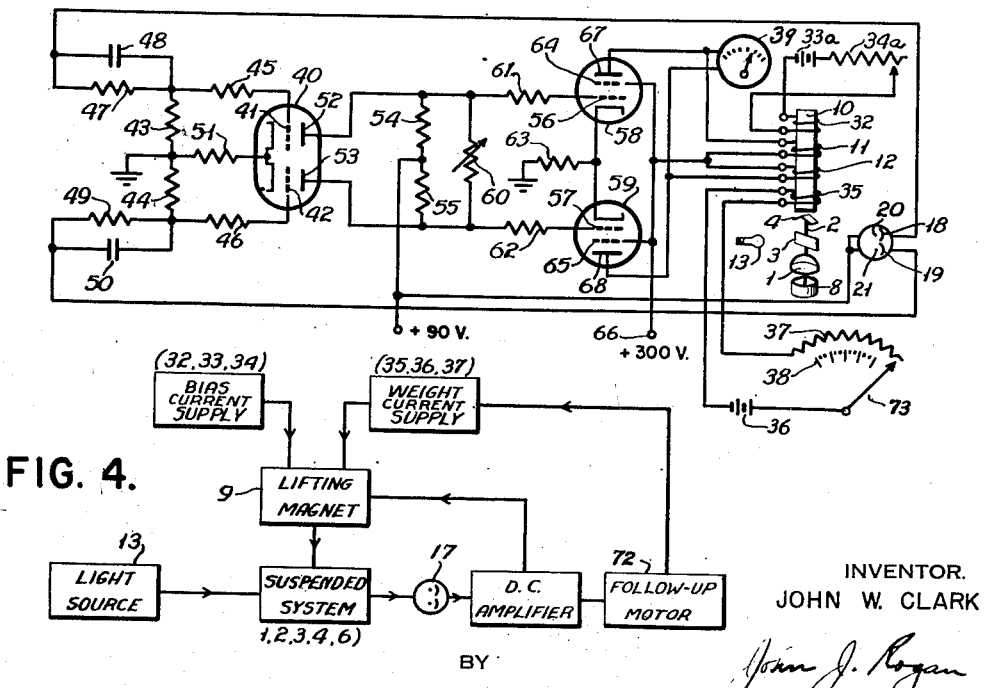
INVENTOR.
JOHN W. CLARK
BY John J. Rogan
ATTORNEY Patented Apr. 13, 1954

2,675,222

UNITED STATES PATENT OFFICE 2,675,222

ELECTRONIC MAGNETIC ANALYTICAL BALANCE

John W. Clark, Cedar Rapids, Iowa, assignor to Collins Radio Company, Cedar Rapids, Iowa, a corporation of Iowa Application September 11, 1947, Serial No. 773,467

6 Claims. (Cl. 265—27)

This invention relates to analytical balances and in particular to a balance which is capable of weighing small quantities of material with great precision.

A principal object of the invention relates to an analytical balance mechanism which is electronically controlled.

Another object is to provide an analytical balance having a single weighing tray whose position is controlled by the material to be weighed and by an electromagnetic system.

Another object is to provide an analytical balance having only a single moving tray, which is free from the usual pivoted beam.

A further object is to provide an analytical balance wherein the balancing action can be controlled by the adjustment of an electronically responsive circuit arrangement.

A still further object is to provide an improved balance of the photo-electric type.

A feature of the invention relates to an electromagnetically controlled balance in which the weighing tray is supported in space by an electromagnet whose energization is controlled by the weight being measured.

Another feature relates to an electromagnetically controlled weighing device employing a balanced electronic amplifier for controlling the equilibrium position of the weighing tray.

Another feature relates to a weighing device having a weighing tray which is electromagnetically supported, the position of the tray in response to the weight thereon serving to control an electric current; in conjunction with a special balanced electronic amplifier system which is controlled by said current and by a separate bias current to produce an output voltage which is proportional to the weight being measured.

A still further feature relates to the novel organization, arrangement and relative interconnection of parts which cooperate to provide an improved electronically controlled weighing device of high precision.

Other features and advantages not specifically enumerated will become apparent after a consideration of the following detailed descriptions and the appended claims.

In the drawing which, by way of example, shows one preferred embodiment of the inventive concept, Fig. 1 is a partial perspective view of the weighing unit according to the invention.

Fig. 2 is a schematic wiring diagram of the electronic balanced amplifier unit that cooperates with the weighing unit of Fig. 1.

Fig. 3 is an enlarged partial view explanatory of the suspension system for the weighing tray in the unit of Fig. 1.

Fig. 4 is a schematic block diagram of a modified weighing and balancing system according to the invention, employing automatic follow-up control.

Referring to Fig. 1, there is shown any suitable form of weighing tray 1, which is suitably attached to a thin but rigid rod 2, which has fastened thereto a light opaque shutter 3. Also fastened to the upper end of rod 2, is a small armature 4 of transformer iron, preferably in the shape of a rectangle with the two halves bent to the form of a broad inverted V as shown more clearly in Fig. 3. Attached to the tray 1 is a downwardly extending thin rigid rod 5 which carries at its lower end a vane 6 which is immersed in the oil 7 in a suitable beaker or cup 8. Suitably supported in fixed position above the armature 4 is an electromagnet 9, comprising a rectangular laminated core 10, having a pair of oppositely wound magnetizing windings 11, 12, a biasing winding 32, and a measuring winding 35, (see Fig. 2). In accordance with one phase of the invention, the windings 11, 12 and 32, are normally and relatively energized so that the armature 4, and therefore the tray 1, are suspended in space at a normal or equilibrium position. The windings 11, 12, have their magnetizing currents controlled by a special balanced direct current amplifier unit (Fig. 2) as described hereinbelow.

The weighing unit also includes a light source 13 in the form of a suitable electric lamp which is attached to a vertically and horizontally adjustable bracket 14. Located between the lamp 13 and the shutter 3 is an apertured diaphragm 15, having an aperture 16, for producing a light beam of substantially the same shape and size as the shutter 3. Suitably mounted in electro-optical alignment with the aperture 16 is a photo-electric cell 17 of any well-known type. Preferably, this cell is of the type having a pair of separate photo-electric cathodes or photo-electron emitting electrodes 18, 19, and their cooperating anodes 20, 21, which are mounted within an evacuated or gas-filled bulb 22, having the usual pronged base for plugging in to the usual contact socket 23. The cell 17 may be Radio Manufacturers Association type No. 920.

In order to protect the tray 1 from disturbing vibrations and air currents, there is provided any suitable enclosing box 24 having a hinged front cover 25 to provide access to the tray 1. Preferably, the electromagnet 9 is attached to the top wall 26 of this box, and the photo-electric cell socket 23 is fastened to the rear wall 27, it being understood that the various lead-in conductors to the magnet windings 11, 12, 32, 35 and to the contacts of socket 23 are accessible from the exterior of the box. The lefthand wall 28 has a window 29, and suitably attached exteriorly to wall 28 in alignment with window 29 is a light-confining casing 30 within which is located the apertured diaphragm 15 and the electric lamp 13. Preferably the upper wall of casing 30 has a slit 31 to permit adjustment of the lamp 13 with respect to aperture 16. In order to adjust the tray and its suspension system to its normal or equilibrium position, the core 10 has the third magnetizing winding 32 which is connected to a suitable steady direct current supply schematically represented by battery 33a, and in series with an adjustable resistor 34a. The winding 32 can be referred to as a bias winding. The fourth magnetizing winding 35 is also provided and can be referred to as the measuring winding. It is connected in series with a suitable steady direct current supply 36 and a variable resistor 37. Windings 32 and 35 are so arranged that they assist each other in the magnetization of core 10, but winding 35 comes into play only when the tray is moved from its equilibrium position as a result of a weight placed on tray 1. For this purpose the circuit through winding 35 may be open when adjusting the current through bias winding 32 to bring the tray suspension system to its equilibrium position.

When the weighing system is in equilibrium, that is, with no weight to be measured on the tray 1, the windings 11 and 12 are energized in opposing relation by the balanced D. C. output of the amplifier; and the electromagnet 9 under control of bias winding 32 maintains the shutter 3 in such a vertical position that the light passing through aperture 16 is completely blanked off from both cathodes 18, 19, or if desired so that both cathodes are equally illuminated. However, when a weight to be measured is placed on tray 1, the shutter 3 moves downwardly, causing the anode 20 to receive a greater quantity of photoelectrons than does anode 21. By adjusting and noting the amount of current through winding 35 necessary to restore the suspension system to its equilibrium position, the weight to be measured can be determined from the weight calibrated scale 38. For the purpose of ascertaining when the system is balanced, a vacuum tube voltmeter 39 is connected to the output of the amplifier. If desired a calibrated current meter can be connected in series with winding 35 to indicate the weight on tray 1.

*The balanced amplifier unit*

This unit is a direct current amplifier, its function primarily being to act on the current-voltage output from the photo-electric cell in such a way that the relative polarities of the currents applied to windings 11, 12, is such as to oppose any motion of the tray suspending system, so that the tray hangs in space and the armature 4 does not touch the electromagnet, and so that the armature 4 does not touch the lower limiting stops 33, 34, which may be in the form of spaced U-shaped non-magnetic wire loops attached to the poles 70 and 71, of the core 10. It should be observed that the stops 33, 34, are spaced apart so as not to interfere with the free movement of rod 2. When the material to be weighed is placed upon the tray 1, the additional current required through winding 35 to restore the tray suspension to its equilibrium position is indicated on the scale 38.

The amplifier comprises a twin triode amplifier tube 40, for example of the Radio Manufacturers Association type Number 6SN7, having the control grids 41, 42, connected in balanced relation to the cathodes 18, 19, of the photo-electric cell 17. For this purpose the grids are returned to ground through equal resistors 43, 44, each for example of 1 megohm in series with respective resistors 45, 46, each, for example, of 0.5 megohm. The cathode 18 is connected to grid 41 through a frequency attenuation network consisting of resistance 47 of approximately 10 megohms, and shunt capacitance 48 of approximately 1 mfd. Likewise, cathode 19 is connected to grid 42 through a similar network comprising resistance 49 and shunt capacitance 50. The purpose of these two networks is to provide the amplifier with a rising gain-frequency characteristic for stability purposes to be explained hereinbelow. The two sections of the twin triode have their control grids suitably biassed by means of the common cathode resistor 51.

The plates or anodes 52, 53, are supplied with the necessary D. C. potential, for example +90 volts through the equal resistors 54, 55, each for example of approximately 0.1 megohm. The plates 52, 53, are coupled to the control grids 56, 57, of two tetrodes 58, 59, by means of an adjustable gain control resistor 60 of approximately 0.5 megohm and the respective series grid resistors 61, 62, each of approximately 0.5 megohm. A common cathode bias resistor 63 of approximately 600 ohms is provided for tubes 58, 59, which may be of the Radio Manufacturers Association type Number 6V6. The screen grids 64, 65, are connected in the usual way to a suitable potential tap 66 for example 300 volts D. C. of the usual D. C. power supply. This same tap is connected in parallel through the differential windings 11, 12, to the respective plates 67, 68.

As pointed out above, the core 10 is built up of transformer iron laminations cut to rectangular shape and with a V-shaped magnetic gap 69, the narrow or apex of the V-gap facing the upward apex of the armature 4 (see Fig. 3). The reluctance of such a magnetic circuit is determined almost entirely by the total air-gap between poles 70 and 71, and between these poles and the armature 4, so that changes in permeability of the iron of the core with repeated cycling (i. e. hysteresis) will be of second order or smaller in their effect on the calibration of the weighing system as a whole.

In designing the balance system, two basic problems are to be considered, namely stability and sensitivity. Two types of instability can occur. The first is a spatial instability. The tray suspension system like any rigid body has six degrees of freedom, namely three of rotation and three of translation. The light beam and electronic amplifier give stability in the vertical direction. The rectangular V-shaped form of armature 4 and its alignment with the air-gap between poles 70 and 71 assure that the suspended system will not revolve. The center of gravity of the suspended system can be so low that it will not turn over. As will be seen from Fig. 3, the shape of the fringing field at the gap between poles 70 and 71, is such that the system will be maintained in free spaced relation with respect to the core 10 and in vertical alignment with the geometrical center of the magnetic gap. Thus, the arrangement of Fig. 3 provides the requisite spatial stability.

The second type of instability which must be avoided in the electronic balance is temporal. The system comprising the electronic amplifier, electromagnet windings 11, 12, light-beam and photocell constitutes a closed feed-back loop which is capable of oscillating. Two types of such oscillation are possible, one a square-wave or multivibrator type of oscillation resulting from a relatively slow response of the system, and the other a sinusoidal oscillation of increasing amplitude resulting if inadequate damping is provided.

The square-wave type of oscillation is prevented by means of the rising gain-frequency characteristic of the balanced amplifier provided by means of the networks 47—48, 49—50 hereinabove mentioned; and also in part by reason of the laminated core 10. Thus the balance current through windings 11, 12, can change very quickly in response to any attempted departure of the suspended system from its equilibrium position.

The sinusoidal type of oscillation is prevented by mechanical damping. This damping is effected by the vane 6 in the oil 7; but, if desired, any well-known method of electromagnetic damping may be used. By suitable design of the high frequency response of the amplifier, it is possible in certain cases to eliminate the necessity of separate mechanical damping. The sensitivity of the balance in milligrams per milliampere, for example 50 milligrams per milliampere, can be controlled within wide limits by a suitable choice of wire size for the weigh winding 35, to give a reasonable current with a typical weighing specimen. It should be observed that the power required to lift a given weight is (except for the variation of form factor with wire size) independent of the particular wire size which is chosen. In one particular balance the resistance of winding 35 was 600 ohms, so that the resultant power sensitivity was 84 milligrams per milliwatt. The stability of the various D. C. power supplies was regulated so that residual hum and fluctuations were 70 decibels down. The stability required of the power supplies can be estimated in a very simple way. Suppose we wish to weigh to ±1 microgram. The total weight of the suspended system must of course be made as small as possible, 10 grams being a reasonable figure. Thus the power supplies should all be stable in the ratio of 1 microgram to 10 grams, or in other words, residual hum and fluctuations must be 70 decibels down. With one model balance, 1 microgram corresponded to an unbalance of 0.01 volt across the balance windings, which was detected with a reasonably good vacuum tube voltmeter.

From the foregoing, it will be seen that the instrument is of the null-balance type, in the sense that the electromagnetically suspended system is always returned to the same point in space, thus eliminating the effect of any non-linearity in the force versus distance function of the lifting magnet. However, the instrument scale 38 must be calibrated against known standard weights. It has been found that the electronic balance described has a precision which is comparable to that of a mechanical beam type analytical balance without imposing unreasonable requirements upon the components, while the sensitivity of the electronic balance can be made to exceed that of the mechanical balance.

In the foregoing, the adjustment of the current through the weighing winding 35 is effected manually. Fig. 4 shows in block diagrammatic form an arrangement for effecting the balancing of the system automatically. The parts in Fig. 4 which are identical with those of Figs. 1, 2 and 3, have adjacent to them the corresponding designation numerals. In this embodiment, the output of the D. C. amplifier, after suitable amplification, is applied to any well-known form of electric follow-up motor 72, whose shaft is connected either directly or through suitable gearing to the adjustable contact element 73, which engages the calibrated resistance 37 above described. By well-known follow-up principles, when the D. C. amplifier is balanced, the motor 72 comes to rest.

The manner of using the device to weigh will be clear from the foregoing description. Thus, before weighing an object, the current through the winding 32 is first adjusted by means of resistor 34a so that the tray 1 assumes its normal or equilibrium position. In this position the windings 11 and 12 are energized in equal but opposite relations under control of the shutter 3, the photoelectric cell 17 and the balanced amplifier. The weight to be measured is then placed on tray 1. The system thereupon departs from equilibrium and the tray and core 10 move downwardly, causing the shutter 3 correspondingly to obscure the cathode 19. This results in an unbalancing of the amplifier and causes a change in current through winding 11. The tray therefore assumes a new position determined by the relative energizations of the windings 11 and 12. The resistor contact arm 73 is then displaced from its normal or zero position to increase the current through winding 35 until the lifting effect of winding 35 restores the tray to its normal or equilibrium position whereupon the amplifier again becomes balanced. The setting of arm 73 is then an indication of the weight on the tray.

What is claimed is:

1. A balancing system of the type described, comprising a movable member which is arranged to be electromagnetically suspended for vertical movement, an electromagnet for suspending said member, said electromagnet having a pair of differentially wound balancing windings, a bias winding for said electromagnet, a measuring winding for said electromagnet, said electromagnet having a substantially linear air gap, a magnetic armature mechanically connected to said member and having a substantially linear edge in spaced parallelism with said gap, an electron tube amplifier having a pair of balanced output circuits, means connecting each of said output circuits to a respective one of said balancing windings, means to supply an adjustable current to said bias winding to support said member against gravity substantially entirely by electromagnetic action from said electromagnet and without mechanical connection of said member to any fixed supports, a light shutter movable with said armature, a light source and photoelectric cell combination controlled by said shutter, circuit connections between said photoelectric cell and the input of said amplifier for unbalancing said output circuits in proportion to the departure of said member from an equilibrium position, and an adjustable current source connected to said measuring winding for restoring said member to its equilibrium position and thereby measuring the amount of said departure from said equilibrium position.

2. A balancing system according to claim 1 in which said photoelectric cell has a pair of photoelectric units positioned with respect to said light source so that when said member is in tis equilibrium position both photoelectric units are equally excited by said light source, said amplifier comprising a pair of grid controlled electron tubes, means connecting one of said photoelectric cell units to the control grid of one electron tube, means connecting the other photoelectric cell unit to the control grid of the other electron tube, and a meter connected across said balancing windings to determine when they are equally and oppositely energized.

3. A balancing system according to claim 1 in which the movement of said member upwardly from its equilibrium position unbalances the output of said amplifier in one sense, and movement of said member downwardly from its equilibrium position unbalances the output of said amplifier in the opposite sense.

4. A balancing system according to claim 1 in which said magnetic gap is located in a horizontal plane, and said armature has said linear edge disposed in spaced alignment with and beneath said gap.

5. A balancing system according to claim 1 in which said photoelectric cell is connected to the input of said amplifier through electrical network means to impart to the amplifier a rising gain versus frequency characteristic for dampening relatively slow undesirable oscillatory movement of said member with respect to its equilibrium position.

6. A balancing system according to claim 1 in which said armature is in the form of a substantially V-shaped magnetic plate having the apex of the V constituting said linear edge.

References Cited in the file of this patent

UNITED STATES PATENTS

| Number | Name | Date |
|---|---|---|
| 1,826,024 | Roller | Oct. 6, 1931 |
| 1,880,563 | Weckerly | Oct. 4, 1932 |
| 1,953,819 | Payne | Apr. 3, 1934 |
| 2,081,367 | Nicolson | May 25, 1937 |
| 2,136,219 | Scherbatskoy | Nov. 8, 1938 |
| 2,141,175 | Dawson | Dec. 27, 1938 |
| 2,148,523 | Baermann | Feb. 28, 1939 |
| 2,360,751 | Ziebolz | Oct. 17, 1944 |
| 2,371,040 | Fisher et al. | Mar. 6, 1945 |
| 2,415,174 | Hurley | Feb. 4, 1947 |
| 2,415,175 | Hurley | Feb. 4, 1947 |